Aug. 19, 1969  H. G. CARLSON  3,462,364
METHOD AND APPARATUS FOR OPTIMIZING CHEMICAL TREATMENT
Filed Jan. 17, 1966  4 Sheets-Sheet 1

INVENTOR.
Herbert Gustaf Carlson
BY Brown, Jackson,
Boettcher & Dienner
ATTYS.

Aug. 19, 1969 H. G. CARLSON 3,462,364
METHOD AND APPARATUS FOR OPTIMIZING CHEMICAL TREATMENT
Filed Jan. 17, 1966 4 Sheets-Sheet 2

INVENTOR.
Herbert Gustaf Carlson
BY

INVENTOR.
Herbert Gustaf Carlson

United States Patent Office 3,462,364
Patented Aug. 19, 1969

3,462,364
METHOD AND APPARATUS FOR OPTIMIZING CHEMICAL TREATMENT
Herbert Gustaf Carlson, 6334 W. Berenice, Chicago, Ill. 60634
Filed Jan. 17, 1966, Ser. No. 521,216
Int. Cl. C02b 1/22; B01d 21/24
U.S. Cl. 210—42                                       11 Claims

ABSTRACT OF THE DISCLOSURE

An apparatus and process for optimizing the addition of lime to water in a water treating system including a pacer unit for receiving a continuous sample of the raw water, an optimizing control device for adding a controlled amount of lime to the water in the pacer unit to maintain the optimum treatment of the water and a conductivity cell in the pacer unit sensing the conductivity of the water at its optimum treatment. A treating unit for treating the raw water including an automatic lime feeder and a conducivity cell in the treating unit sensing the conductivity of the treated water, the conductivity cells being connected to a conductivity ratio controller which compares the conductivity of the pacer unit with the treating unit and operates the lime feeder in accordance with the conductivity comparison to maintain a predetermined ratio between the conductivities.

---

This invention relates to an apparatus and a process for the treatment of liquids with chemicals and specifically to an apparatus and process which are automatically controlled.

It is an object of the invention to provide an improved control apparatus, which is simple and reliable, for treating water with lime.

Another broad object is to provide an improved optimizing apparatus and process for automatically controlling the chemical feed to a treating process to achieve a constant result regardless of process variations.

Another object of my invention is to provide an improved apparatus and process for automatically controlling the reagent feed to a liquid of varying quantity and/or quality and to maintain the optimum treatment thereof.

Another object is to provide an improved apparatus and process for treating water with lime wherein the treatment is controlled and "paced" by separate treatment of a smaller volume of that water.

Another specific object is to provide an electro-mechanical apparatus, which maintains optimum treatment of water with lime by continuously and automatically maintaining the lowest conductivity in the treated water.

Another object of my invention is to provide an apparatus and process for treating a liquid wherein the degree of the treatment may be automatically controlled.

Lime treatment of water is the common method whereby hardness, calcium and magnesium salts are chemically precipitated. Treating units of the continuous sludge or solids contact type are widely used for carrying out these precipitation reactions. These treating units basically comprise a primary reaction zone where the entering raw water and recirculated sludge are mixed, along with addition of lime, soda ash, and coagulant. The water is then circulated to the clarification and settling zone where treated water is withdrawn and precipitated slurry is returned to the primary zone to provide a contact medium for further precipitation reactions.

The lime added to treating units is usually fed as a thin slurry in quantities proportional to the raw water flow. Such feeding requires the installation and maintenance of accurate chemical feeders and proportioning equipment. Further, with a raw water which varies in chemical quality, the proper quantity of lime to be fed must be established by chemical tests of the treated and raw water and manual adjustments must be accordingly made.

There is, in view of the foregoing, a definite need for an accurate, simple, and reliable means of controlling the chemical feed to a water treating unit which is determined by means other than be rate of flow.

The process and apparatus of my invention is based upon the conductivity of the water for the control of chemical feeding. The utilization of conductivity for proportioning chemicals to a liquid is in itself not new, however, I have discovered a new and improved way of using this principle.

The basic principle of my invention is that the electrical conductivity of water is dependent upon its chemical composition. For example, a raw untreated water having alkalinity and hardness has a much higher conductance than the same water when the calcium bicarbonate is precipitated with lime. Further additions of lime cause an excess of lime and a corresponding increase in the conductivity of the water. A graphic representation of the conductivity plotted against the chemical addition would show a continuous decrease to a minimum point and thereafter an increase would occur. From this it can be easily seen that the point of optimum lime or chemical feed is the amount of lime or chemical that is required to maintain the point of lowest conductance. With this established minimum conductance as reference any higher conductance in the treated water represents either an excess or an insufficient amount of lime. It should be noted that in some cases due to water quality, the point of minimum alkalinity may not exactly correspond to the point of minimum conductance although it approaches it. Nevertheless, with my novel system as hereafter described I can "bias" my control to compensate for this difference or to under or over treat the liquid.

I control the lime feed to the treating unit by employing a separate, smaller unit which paces the feed to the treating unit. In the pace unit raw water is treated with lime and by means of a novel optimizing control device, which will be described in detail hereafter, the lowest conductance possible is maintained therein. This conductance in the pace unit then represents the reference conductance. An electrode is placed in the pacer unit and a second electrode is placed in the treating unit. The respective conductances are measured and compared by a conductivity controller with the conductance in the pace unit as a reference. The conductivity controller is set to maintain a constant ratio between the conductances in pace and treating units by feeding or discontinuing feeding lime to the reaction zone of the treating unit. When the conductance ratio is 1.0 the conductivity of the water in the treating unit would be the same as that in the pacer unit and hence the lowest and the optimum lime feed would be established in the reaction zone. If, because of the particular water, the lowest conductivity does not represent the lowest alkalinity, which fact can be established by chemical tests, a ratio other than 1.0 can be maintained to bias the treatment. Also, it may be desirable to over or under-treat and the ratio of the conductances may accordingly be adjusted to bias the treatment.

The invention will be more readily understood by consideration of the drawings, wherein.

Figure 1:
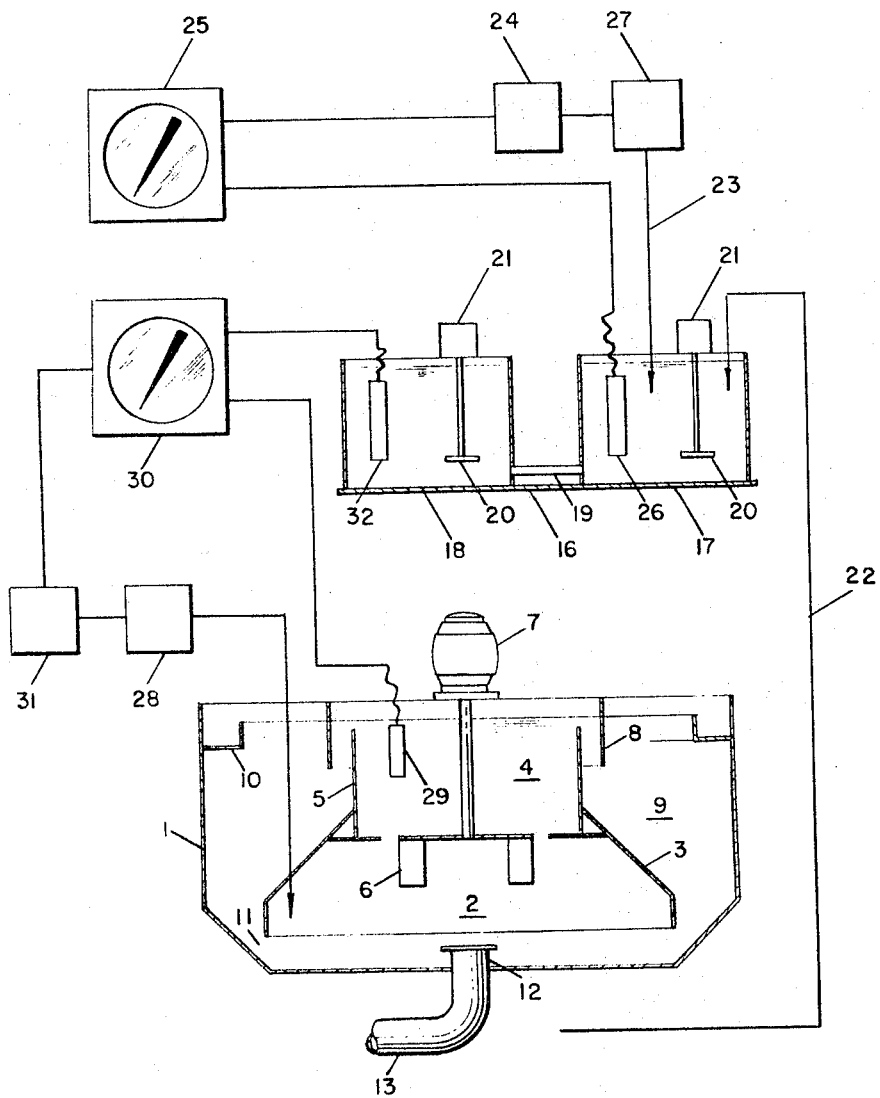
FIGURE 1 shows diagrammetically the solids contact unit and the associated lime control means.

In the apparatus of FIGURE 1 the unit 1 is a standard solids contact treating unit having a central primary mixing and reaction zone 2 defined by draft tube 3 and a secondary mixing and reaction zone 4 formed within vertical draft tube 5. Raw water inlet 12 discharges raw water pump through inlet pipe 13 into the primary reaction zone. Within the secondary zone 4 is a rotor-impeller 6 for mixing and pumping which is rotated by a motorized drive 7. Draft tube 8 is concentric with inner draft tube 5 and the two form a passageway from the secondary reaction zone to the outer clarification zone 9 from which clarified water overflows into launder 10 and is withdrawn from the unit. A lower passageway 11 provides for return flow of precipitant and water, called slurry, from the clarification zone to the primary reaction zone.

The pacer unit generally indicated at 16 comprises two chambers, the reaction chamber 17 and the surge chamber 18 which are in hydraulic communication near their bottoms through tube 19. A paddle agitator 20 driven by a small electric motor 21 is located in each chamber to aid the chemicals reaction. Raw water, a small fraction of the volume undergoing treatment in the solids contact unit but from the same source, is introduced into chamber 17 through line 22. The pacer unit must, like the treating unit being paced, contain sufficient calcium carbonate precipitate to provide quick and uniform conductance changes. The calcium carbonate, although it does not react, provides a proper reaction environment and acts in a manner similar to a catalyst in aiding the reactions of the lime and raw water in reaching equilibrium. Therefore, both lime and calcium carbonate may be mixed together and may be fed to the pacer unit through line 23 by feeder 27 or they may be fed separately.

The chemical feed of lime to treat the water in the pacer unit is controlled by the optimizing device. This device, which maintains the lowest conductance possible in the treated water by addition of lime, establishes a reference for treatment in the solids contact unit. The optimizing device, FIGURES 1 and 2, comprises a conductivity cell 26 of known construction which extends into the reaction chamber of the pacer unit. A electro mechanical controller 25 is electrically connected to the starter 24 of the chemical feed device 27. The optimizing device which forms an essential part of my invention shown in detail in FIGURES 2, 3, and 4 and is fully discussed with reference to those figures, starts and stops the chemical feed so as to maintain the lowest possible conductivity in the pace unit.

A conductivity ratio controller 30 is used to control the amount of lime fed by pump 28 to the treating unit 1 by comparatively measuring the reference conductivity in the pacer unit and in the treating unit and starting and stopping the lime feed accordingly. The ratio controller is of standard design and is of a type such as the RE 13 Solu Bridge controller sold by Industrial Instruments Incorporated of Cedar Grove, N.J. One conductivity cell 32 electrically connected to the controller is immersed in the surge tank of the pacer unit and another conductivity cell 29 also electrically connected to the controller is immersed in the secondary reaction zone of the treating unit. The conductivity controller is electrically connected to the starter 31 of the lime feeder drive 28. A ratio, usually 1.0, is set on the controller between these conductances and the instrument automatically starts and stops the lime feed to maintain the ratio regardless of changes in the alkalinity and hardness of the raw water.

Figures 2, 3:
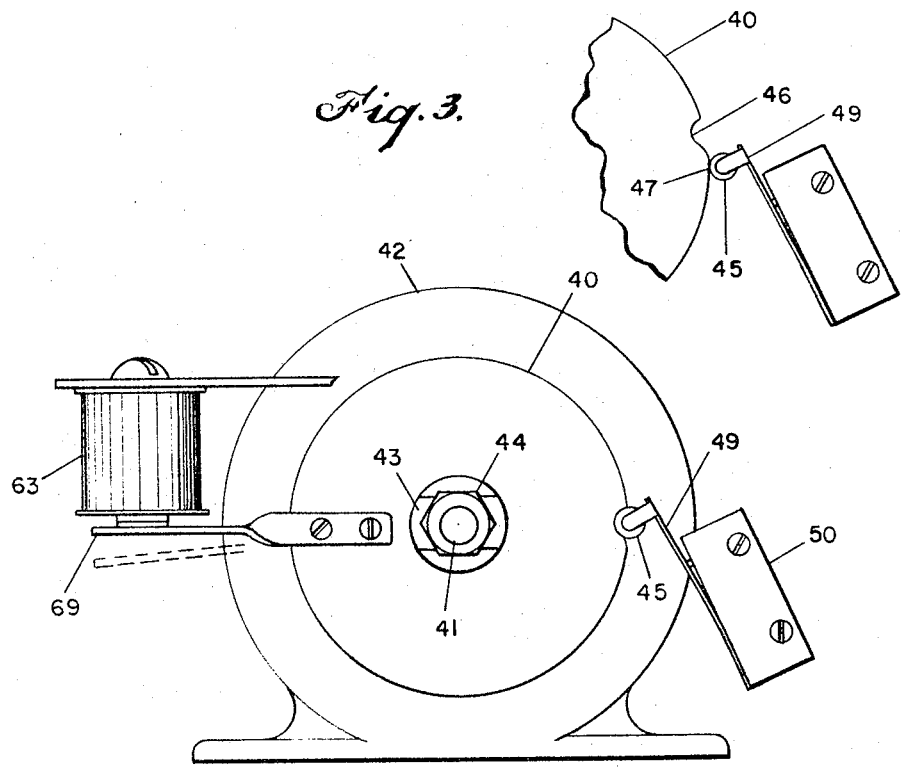
FIGURE 2 is a front elevation showing in detail the balancing motor and cam arrangement.
FIGURE 3 is a partial detail of the cam and follower of FIGURE 2.
Figure 4:
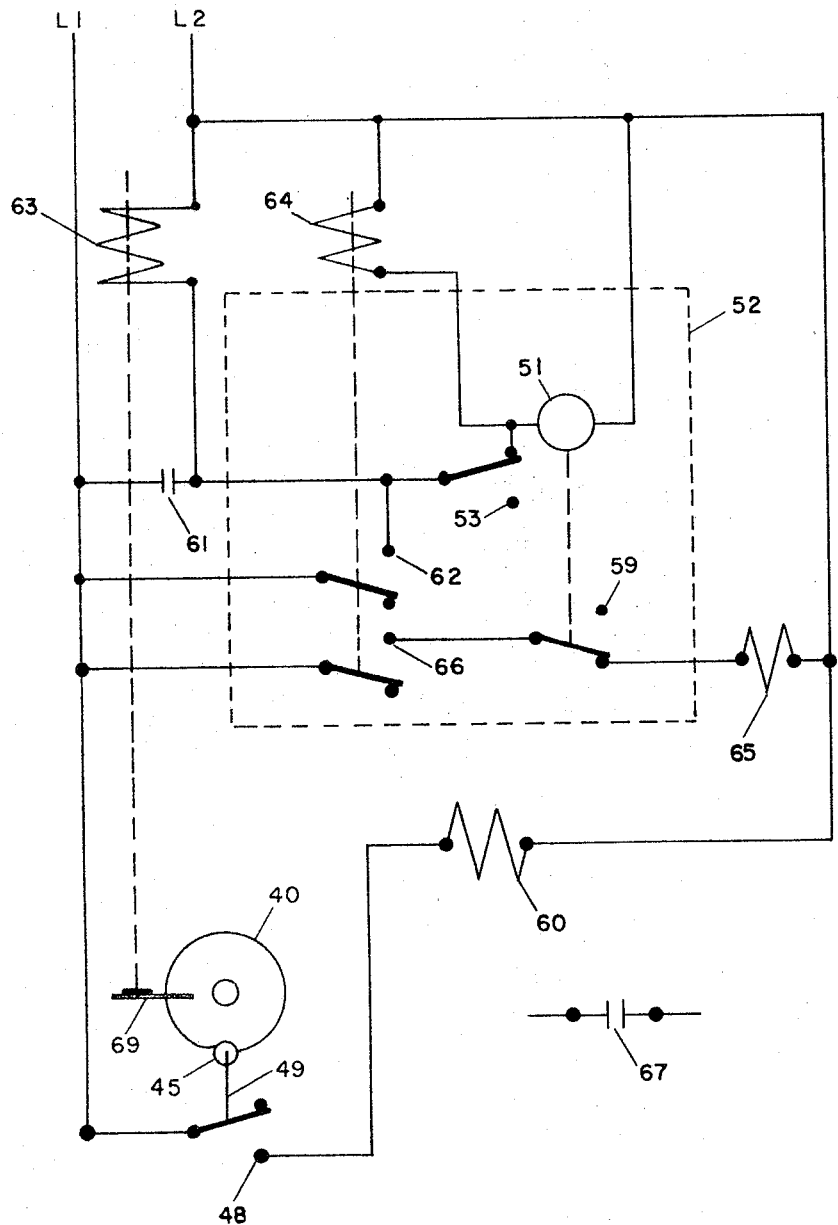
FIGURE 4 is a wiring diagram of the optimizing control device.

FIGURE 4 shows the simplified schematic wiring diagram of the optimizing device 25 and FIGURES 2 and 3 shows in detail the cam-operated microswitch which is center of the optimizing system.

Referring to FIGURES 2 and 3, 40 is a cam fastened to shaft 41 rotated by a balancing motor 42 of standard design which is responsive to conductivity changes as measured by conductivity cell 26 (FIGURE 1). The motor shaft rotates counterclockwise when the conductivity rises and clockwise on falling conductivity. A balancing motor as contained in a RI 3 conductivity instrument made by Industrial Instruments is typical. The cam is fastened to the shaft only by light friction provided by a flat spring fastener 43 which is held in place against the face of the cam by nut 44. The cam is limited in rotational movement to about 2°. This slight movement in the counterclockwise direction is enough to cause the follower 45 to move from a position in notch 46 of the cam to point 47 on the cam surface as shown in FIGURE 3. This in turn will depress actuator arm 49 and allow current to flow between the contacts of microswitch 50 making a circuit. Should the conductivity be falling, shaft 41 will rotate in a clockwise direction causing the notch 46 to engage the cam follower 45 and prevent rotation of the cam. Because of the light friction between the cam and the shaft, the shaft is allowed to continue to rotate freely within the cam.

Referring now to the schematic wiring diagram of FIGURE 4, which is the electrical control of the optimizing system, L1 and L2 represent an A.C. power source. 60 is the coil of a time delay relay which when energized closes contact 61.

52 is a timer of standard manufacture such as the Cycl-Flex timer made by Eagle Signal Corporation. The timer includes contacts 62 and 66 which are opened and closed by coil 64. Timing motor 51 operates contacts 59 and 53. 65 is a sequence relay which operates contacts 67 in the control circuit line to starter 24 of chemical feeder 27.

Assuming contact 67 is open, that is, the chemical feed is off and the conductivity begins to rise the operation of the optimizing device would be as follows: On rising conductivity shaft 41 rotates cam 40 in a counterclockwise direction causing cam follower 45 to ride up to cam surface. Actuator arm 49 is depressed closing contact 48 energizing time delay relay 60. The time delay is provided to prevent fluctuation due to small oscillations in conductivity and to eliminate false operation of the optimizing device.

After the time delay, which will usually be about two seconds, but which may be adjusted in accordance with the system, contact 61 closes. This completes a circuit through contact 53, coil 64, and the timing motor 51 which now begins its timing cycle. Also current now flows to coil 63.

The instant coil 64 is energized; it acts to close contacts 62 and 66. When contact 66 is made a circuit through contact 69 and sequence relay 65 is completed. The sequence relay acts to make and break each alternate time its coils is energized. That is, if as in the instant case contact 67 going to the starter of the chemical feeder is open, it will now close completing that circuit.

Also when electro magnetic coil 63 was energized it exerted a pull on the lever 69 of cam. This acts to immediately reset the cam by causing the follower 45 to drop back into notch 46. During the entire timing cycle, now running, the cam is held in a stationary position by lever 69 and notch 46 which engages the cam follower 45. The shaft due to the light friction attachment is free to rotate in either direction.

When the cam has been re-set contact 48 is now in an open position. This de-energizes coil 60 and accordingly contact 61 opens. Nevertheless because contacts 62 and 66 are now closed the circuits to coils 64 and 63 are still complete. At the end of the timing cycle contacts 53 and 59 are caused to open de-energizing coils 64 and 65. When coil 64 is de-energized contacts 62 and 66 immediately open and thereafter contacts 59 and 53 turn to their normally closed position.

At this point, the chemical feed is operating and contact 67 is closed and the sequence of the system is dependent upon the direction of rotation of the shaft.

If the conductivity has started to decrease and the shaft accordingly is rotating clockwise the shaft will continue to rotate freely and the system will continue to feed. This is because the system is tending to approach the lowest conductivity. On the other hand, when the conductivity begins to increase, the shaft will rotate in a counterclockwise direction causing contact 48 to close. This will initiate the series of events discussed with the exception that sequence relay will now reverse its operation and cause contact 67 to open discontinuing the chemical feed.

Instead of the single contact 67, a normally open and a normally closed contact may be used to alternately feed the water or chemical feed.

Figure 5:
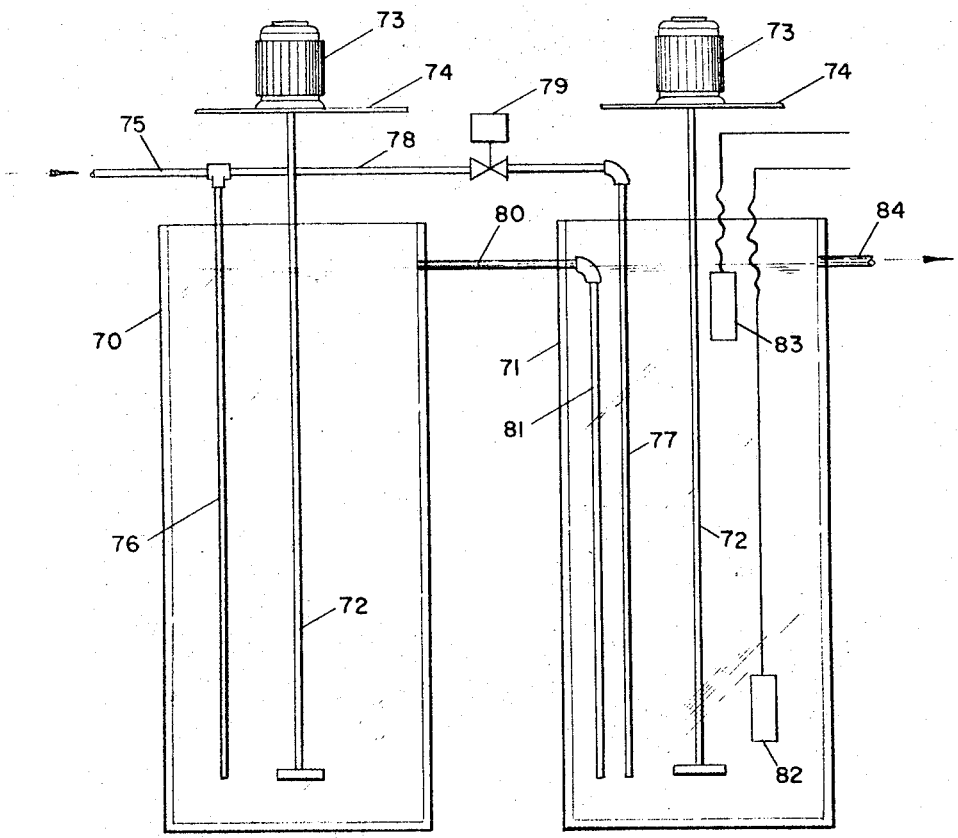
FIGURE 5 illustrates another embodiment of the pacer unit.

The pacer unit may take a number of forms, for instance, another embodiment is shown in FIGURE 5.

In this form the lime is continuously fed into the pacer unit containing a slurry of calcium carbonate and the flow of raw water is controlled by the optimizing device to maintain the lowest conductivity. The advantage of this method is that troublesome lime caking in the pipes is eliminated and the final result, that of providing a conductivity reference base, is still achieved. Further, if desired, it would be possible to intermittently feed both or either the lime and raw water. If the lime is being fed to control conductivity, the raw water can be shut off during the lime feed or if the raw water is being fed the lime can be shut off. This would effect a faster reaction time and provide a more responsive system.

In the apparatus of FIGURE 5 cylinder 70 serves as the means for continuously preparing a saturated lime solution and cylinder 71 is the pace cylinder wherein the precipitation reactions occur and the conductivity is measured. Within both cylinders is an agitator 72 which is driven by motor 73 mounted on base 74. Both cylinders are shown as being made of plastic to facilitate observation of the contents, however, any suitable material can be used.

Raw water from the same source as that undergoing treatment is introduced by tube 75 which has branches 76 and 77 depending to near the bottom of cylinders 71 and 70 respectively. Branch 78 has a solenoid operated valve 79 located in it which controls the flow of water through it. Since the flow rate is low the lime necessary in cylinder 70 for preparing the saturated lime solution can be changed by hand. For instance, at a feed of 10 ml./min. of saturated lime solution to the pace cylinder, only about a pound of lime per week is required. This reduces operator attention to a weekly basis. The water introduced near the bottom of the cylinder 70 mixes with the lime to form a suspension in the lower portion of the cylinder and then overflows as a lime solution through outlet 80 and tube 81 to the lower portion of the pacer cylinder 71.

An initial charge of calcium carbonate is retained in the lower portion of cylinder 71 in the form of a sludge blanket to maintain the proper reaction environment. One conductivity cell 82 is inserted in this sludge blanket near the bottom of the cylinder and is connected to the optimizing device. The other cell 83 is located near the liquid surface and is connected to the ratio controller for comparison with the conductivity of the liquid in the treating unit. An overflow 84 is provided to carry off the excess treated liquid. In the system of FIGURE 5 the optimizing device maintains the lowest conductivity in cylinder 71 through contact 67 which intermittently opens and closes solenoid valve 79 in the raw water line responding to conductivity changes to admit raw water to the cylinder. Lime solution is continuously being fed into the pacer unit from cylinder 70. As discussed it is possible to stop feeding lime solution when the raw water is being fed. This could be accomplished simply by placing a solenoid valve in line 80. Such an arrangement would have the advantage of increasing the response time.

Looking at FIGURE 1 the overall operation of my invention is as follows:

Raw water is introduced into the solids contact unit and a small fraction of the volume is diverted into the reaction chamber of the pacer unit. To insure the proper reaction environment, calcium carbonate is fed along with the lime slurry into the reaction chamber.

The sensing unit for the optimizing control device is a dip type conductivity cell located in the treated water in the pacer unit, which transmits electrical impulse to the balancing motor of the controller on the shaft of which is located the control cam. As explained above, when the conductivity rises the control cam rotates in a counterclockwise direction causing the microswitch to close causing a sequence relay to operate and thus stopping or starting the chemical feed. If on the other hand, the conductivity is decreasing the shaft of the balancing motor will turn in a clockwise direction. The cam follower will engage the notch in the cam and the shaft will turn free in the cam. As soon as there is a reverse trend in the conductivity the shaft will turn counterclockwise causing the circuit to be made and the above described process is repeated. This novel control device will also seek to maintain the conductivity in the pacer unit at the lowest possible thus assuring optimum chemical treatment.

Conductivity cells 32 and 29 measure the conductivity of the water in the pacer unit and of that in the solids contact unit. Cell 29 may be placed in a number of positions within the unit such as in the effluent weir or in either the primary or secondary reaction chamber. For present purposes and to obtain a measurement representative after complete reaction, the cell is placed in the secondary reaction zone.

In response to the impulse signals from the cells, the ratio controller energizes and de-energizes the starter 31 of the lime feeder motor 28. The ratio is preferably set at one 1.0, and in this way, optimum lime treatment despite varying conditions is assured. If the operator of the plant wishes to use less lime than optimum he may set the ratio controller for a ratio less than one. If the operator wishes to over-treat, that is, use an excess of lime, he sets the ratio for more than one.

The chemical, in the correct proportion to the quality of the raw water is then fed into the primary reaction zone of the treating unit. The chemical reactions take place in the presence of a slurry of previously formed precipitate in a manner well known in the art. This accelerated solids contact treatment per se forms no part of my invention.

To test the effectiveness of my invention for controlling lime feed from conductivity rather than rate of flow the following laboratory experiment was conducted:

A standard pilot plant model Accelator® solids contact treating unit as manufactured by Infilco of Tucson, Ariz., of 3'0" diameter and having a 3'0" side liquid depth was operated at 5 g.p.m.

A separate small unit similar to that of FIGURE 1 was set up to "pace" the larger unit. This unit was made up of 2 one-liter plastic cylinders 4⅜" I.D. with a liquid depth of 4". These cylinders were mounted on a common base with a piece of ¼" I.D. tubing hydraulically connecting the cylinders approximately 1" from their bottom. In each chamber was a simple agitator paddle having a 1" x 2" blade. The paddle operated at 400 r.p.m. in the reaction chamber and at 212 r.p.m. in the surge chamber. Raw water discharged into the reaction chamber at a rate of 100 ml./min.

The optimizing device to control lime feed to the reaction chamber of the pacer unit was arranged with one dip type conductivity cell placed in the reaction tank. The impulse signal from this cell controlled the chemical feed. The electrical and mechanical apparatus of the optimizing device was basically that of FIGURE 4 with the timer being a standard Cycl-Flex timer set at 11 seconds.

A conductivity ratio controller was used to control the amount of lime fed by the chemical feeder to the secondary reaction zone of the Accelator® solids contact unit. The instrument used was an RE 18 G Solu-Bridge controller. A pair of conductivity cells, one extending into the surge chamber of the pacer unit and one located in the secondary reaction zone of the solids contact unit was used to measure the respective conductances. The ratio of these conductances was set at 1.0 and the controller was electrically connected to the starter of the lime feeder drive.

The optimum treatment maintained in the pacer unit was, due to the ratio controller, maintained in the standard treating unit and a uniformly treated water resulted.

The apparatus and process of my invention is particularly useful in the treatment of liquids with lime to maintain an optimum treatment. The invention is not so, however, limited as the novel control device could be used to add a reagent to any process displaying the characteristic of having a process variable decrease to a minimum point or increase to a maximum critical point and thereafter reverse with further addition of the reagent. The variable characteristic might be pH, viscosity, temperature and the like. In such a case a sensor that would transmit an impulse in relation to the characteristic being increased would be substituted for the conductivity cell of the optimizing device. Basically, however, the system would remain the same.

Several distinct features of my unique control should be noted. First of all, the control is an optimum point holding device as it always seeks to maintain the conductivity at the lowest possible point and hence the optimum treatment regardless of what the conductivity is numerically. As the chemical and water react and the conductivity goes down, the cam follows the conductivity down, re-setting the point at which the sequence relay is energized. When enough chemical has been added, the conductivity will stop going down, and, as excess chemical is added, the conductivity begins to go up. Thus the quality of the water may change and the system will automatically follow any changes.

It is possible that the logic in the system is susceptible to an ambiguity, which could result in operation 180° out of phase. For instance, if the system were not feeding chemical, and the conductivity begin to rise, not because of insufficient treatment but rather because of excess treatment, the cam would cause the microswitch contacts to close and the sequence relay would be energized starting the lime feed, which is entirely wrong. This feed would last for the setting of the timer, after which time, the continuing conductivity rise due to the overfeed would cause contact 48 to again close, energizing the time delay relay. Sequence relay would now reverse and immediately stop the feed. Thereafter the conductivity should start decreasing and the system would remain in a no-feed condition until a conductivity rise again occurred. Because of the characteristics of the sytsem and the holding time of the treating unit, this operational risk is not serious nor does it adversely affect the operation of the system.

Of course, if a more sophisticated system is required, a logic circuit can be added to the present control system and, in this way, the control can know what branch of rising conductivity it is looking at. That is, the system will be able to detect whether rising conductivity is due to either insufficient feed or due to an overfeed and an excess of lime. For instance, this could easily be done in the following manner: If the unit sees rising conductivity and knows that at this time the lime feed motor is on, it may know which side of the branch it is looking at. The only possible instruction is that the feed motor should be turned off. Conversely, if the unit sees rising conductivity and the feed motor is off, it knows that the proper instruction is to turn the motor off.

A further feature incorporated in my system is the provision of a high alarm contact. This is done simply by attaching another cam with a set screw to shaft 41 of the motor 41. This second cam is notched and is set to actuate a switch when abnormally high conductivity is present. This might occur when the lime or the water feed has stopped for some reason.

It should be noted that, although I have shown a specific electromechanical device for optimizing the lime feed any means, whether electrical, pneumatic or mechanical may be used as long as the means used operates to alternately feed chemicals on increasing conductivity and not feeding on decreasing conductivity without departing from the spirit of my invention.

The system of my invention provides a simple, automatic, reliable means of controlling the feeding of chemical to obtain a uniformly treated final water with a minimum of operator attention.

I claim:
1. A method of regulating addition of a reagent to a substantially continuous chemical treatment process, in which a persistently modulated supply of reagent is required to accommodate a variance in a measurable characteristic of the feed material to be treated, comprising:
   (a) separating a minor portion of the feed material from the main supply of feed material,
   (b) treating the separated minor portion of the feed material with the requisite quantity of reagent until a critical point is reached in the measurable characteristic in the material to be treated, said critical point being related to the optimum quantity of required reagent,
   (c) sensing the measurable characteristic of the treated minor portion of the feed material to provide a pace signal in relation to said measurable characteristic,
   (d) supplying a quantity of reagent to the main supply of feed material,
   (e) sensing the measurable characteristic of the treated feed material to provide a base signal; and
   (f) comparing the pace signal with the base signal and modulating the supply of reagent to the main supply to maintain a predetermined ratio between the pace signal and the base signal.

2. A method of automatically controlling the addition of a reagent in a substantially continuous process wherein a variable of the process responds to the addition of said reagent to a critical point comprising:
   (a) sensing the variable and controlling the addition of the reagent therefrom to increase the quantity of the chemical reagent each alternate time the value of the variable reverses and begins to approach the critical point,
   (b) continuing the feeding of reagent for a predetermined period of time; and
   (c) thereafter continuing feeding reagent at the increased quantity if the variable is receding from the critical point and decreasing the quantity of reagent if the variable is approaching the critical point.

3. The method according to claim 2 wherein said process is the treatment of liquid with lime and the variable is conductivity.

4. A method for automatically maintaining the optimum lime feed to a continuous liquid treating unit having a mixing and reaction zone and a clarification zone in which additions of lime accommodate a variance in the conductivity of the liquid undergoing treatment to a critical point, comprising separately treating a small sample of the liquid to be treated with lime to maintain the lowest conductivity therein characterized by sensing the conductivity of the sample, controlling the feed of lime to the sample to induce approximately the lowest conductivity maintainable therein, sensing the conductivities of the treated water sample and the water in the mixing and reaction zone of the treating unit and controlling the lime feed to the treating unit therefrom to maintain a predetermined ratio between said conductivities.

5. The method according to claim 4 wherein the lowest conductivity in the separately treated sample is induced by alternately feeding lime for a predetermined time whenever the value of the conductivity exhibits a reversing and begins to approach the critical value.

6. An apparatus for automatically regulating the addition of lime to a liquid treatment process from the conductivity of the liquid undergoing treatment comprising:
   (a) a chemical feeder,
   (b) sequence relay means in the power circuit to said chemical feeder that when energized alternately actuate said chemical feeder,
   (c) means for continuously measuring the conductivity of the liquid undergoing treatment, said measuring means transmitting signals corresponding to the conductivity measured,
   (d) control means responsive to changes in conductivity, said control means being adapted to receive the signals transmitted by said sensing means and to energize said sequence relay means whenever an increasing conductivity trend reverses and begins to decrease; and
   (e) timer means for continuing operation of the chemical feeder for a minimum predetermined period of time when activated.

7. The apparatus of claim 6 wherein time relay means are interposed between said control means and said sequence relay means.

8. A plant for automatically treating a liquid with lime comprising a first treating unit having an inlet for raw liquid to be treated and an outlet for treated water, first lime conveying means for conveying lime into said first treating unit, means for starting the operation of said first lime conveying means, second liquid treating means having a mixing chamber and surge chamber in hydraulic communication, an inlet for a small volume of water to said mixing chamber, a mixing device in each chamber, second lime conveying means for conveying lime to said mixing chamber, means for starting the operation of said second lime conveying means, conductivity sensing means in said mixing chamber, a balancing motor electrically connected to said sensing means and rotatably responsive thereto, cam means attached to the shaft of said balancing motor, a follower for said cam, a microswitch adapted to be actuated by said cam follower to make and break a control circuit, a sequence relay in said control circuit which controls the power circuit to the starter of said second lime conveying means, means in said control circuit for resetting the microswitch, a timer in said control circuit for regulating the minimum period of time durng which the second lime conveying means operates, a conductivity ratio controller, a second power circuit through said controller and said means for starting the operation of said first lime conveying means, a pair of electrodes connected to said conductivity controller, one of said electrodes extending into the treating unit and measuring the conductivity of the contents of said treating unit, the other of said electrodes extending into the surge tank of said second treating means and measuring the conductivity of the contents, each of said electrodes measuring the conductivity and sending impulses to said conductivity controller, said conductivity controller closing and breaking the power circuit to the starter of said first lime feeding means to maintain a pre-set conductivity ratio.

9. The apparatus of claim 8 wherein the first treating unit is a solids contact type slurry recirculation unit having a mixing and reaction zone, a clarification zone, and a sedimentation zone.

10. A plant for automatically treating a liquid with lime comprising a first treating unit having an inlet for raw liquid to be treated and an outlet for treated water, lime conveying means for conveying lime into said first treating unit, means for starting the operation of said first lime conveying means, second liquid treating means having a lime slurry cylinder and a reaction cylinder, conduit means for continuously withdrawing lime slurry from said lime cylinder and introducing it near the bottom of said reaction cylinder and forming a sludge blanket therein, a first inlet conduit for raw water to said lime slurry chamber, a second inlet conduit for raw water to said reaction chamber, a mixer device in each of said chambers, an overflow for treated water in the upper portion of the reaction cylinder, a first electrode extending into the reaction cylinder in the sludge blanket near its bottom, said electrode transmitting an electrical impulse proportionate to the conductivity measured, control means adatped to receive the impulse transmitted by said first electrode and to operate the valve means located in said second inlet conduit means to maintain the lowest conductivity in the reaction chamber by controlling the quantity of water admitted to the reaction chamber, a second and third electrode extending and measuring, respectively, the treated water in the reaction cylinder and the treating unit, a conductivity ratio controller, said second and third electrodes being electrically connected to said controller and transmitting thereto electrical impulses proportionate to the conductivity measured, a power circuit through said controller and the means for starting and stopping operation of said lime conveying means, to control the admission of lime to the first treating unit to maintain a predetermined conductivity ratio.

11. The apparatus of claim 10 wherein means are provided in the lime slurry conduit means whereby lime feed is discontinued during the period when raw water feed is activated.

References Cited

UNITED STATES PATENTS

| | | | |
|---|---|---|---|
| 2,627,453 | 2/1953 | Sheen | 23—253 |
| 2,668,097 | 2/1954 | Hallikainen et al. | |
| 2,715,610 | 8/1955 | Thompson. | |
| 2,989,377 | 6/1961 | Leisey. | |
| 3,073,682 | 1/1963 | Lindsley | 23—253 XR |
| 3,192,017 | 6/1965 | Kruger | 23—253 |
| 3,238,128 | 3/1966 | Gustafson | 23—253 XR |

MORRIS O. WOLK, Primary Examiner

R. E. SERWIN, Assistant Examiner

U.S. Cl. X.R.

23—230, 253; 210—49, 143, 198, 208